US009701201B2

(12) United States Patent
Joo et al.

(10) Patent No.: US 9,701,201 B2
(45) Date of Patent: Jul. 11, 2017

(54) INPUT APPARATUS FOR VEHICLE AND VEHICLE INCLUDING THE SAME

(71) Applicant: HYUNDAI MOTOR COMPANY, Seoul (KR)

(72) Inventors: Sihyun Joo, Seoul (KR); Jeong-Eom Lee, Yongin-si (KR); Jungsang Min, Seoul (KR); Gi Beom Hong, Bucheon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 25 days.

(21) Appl. No.: 14/940,082

(22) Filed: Nov. 12, 2015

(65) Prior Publication Data

US 2017/0001521 A1    Jan. 5, 2017

(30) Foreign Application Priority Data

Jul. 2, 2015    (KR) .................. 10-2015-0094681

(51) Int. Cl.
*B60R 13/00*    (2006.01)
*B60K 35/00*    (2006.01)
(Continued)

(52) U.S. Cl.
CPC ............... *B60K 35/00* (2013.01); *B60N 2/46* (2013.01); *F16H 19/04* (2013.01); *F16H 25/20* (2013.01);
(Continued)

(58) Field of Classification Search
CPC ............... A44B 11/2511; B60T 17/225; B65D 2543/00092; B65D 2543/00296; B65D 2543/00509; H03K 19/1737; H03K 19/17704; H03K 19/17728; H03K 19/17736; H01L 2924/00; B60K 35/00; B60K 2350/406; B60K 2350/925; B60N 2/46; F16H 19/04; F16H 25/20; B60R 7/04
(Continued)

(56) References Cited

U.S. PATENT DOCUMENTS 6,921,118 B2 *    7/2005    Clark ................... B60N 2/4686
                                                            296/24.34
6,942,267 B1 *    9/2005    Sturt ...................... B60N 3/107
                                                            248/311.2
(Continued)

FOREIGN PATENT DOCUMENTS

JP    2002-283868 A    10/2002
JP    2008-290542 A    12/2008
(Continued)

OTHER PUBLICATIONS

Korean Notice of Allowance dated Apr. 3, 2017, issued in Korean Patent Application No. 10-2015-0094681. (w/English translation).

*Primary Examiner* — Kiran B Patel
(74) *Attorney, Agent, or Firm* — McDermott Will & Emery LLP

(57) ABSTRACT

An input apparatus for a vehicle includes a cover member for covering an upper part of an input unit installed in a center plate provided between a driver seat and a passenger seat, wherein the cover member moves forward from a center console located in a back part of the center plate to cover the upper part of the input unit.

6 Claims, 19 Drawing Sheets

(51) Int. Cl.
  *F16H 19/04*  (2006.01)
  *F16H 25/20*  (2006.01)
  *B60N 2/46*   (2006.01)
  *B60K 37/06*  (2006.01)

(52) U.S. Cl.
  CPC ........ *B60K 37/06* (2013.01); *B60K 2350/102* (2013.01); *B60K 2350/1024* (2013.01); *B60K 2350/1036* (2013.01); *B60K 2350/2091* (2013.01); *B60K 2350/406* (2013.01); *B60K 2350/925* (2013.01)

(58) Field of Classification Search
  USPC .................................................... 296/24.34
  See application file for complete search history.

(56) References Cited

U.S. PATENT DOCUMENTS

| | | | | |
|---|---|---|---|---|
| 7,287,795 B1* | 10/2007 | Thomas | .................... | B60R 7/04 296/24.34 |
| 7,445,261 B2* | 11/2008 | Joler | ........................ | B60R 7/04 296/24.34 |
| 7,475,954 B1* | 1/2009 | Latunski | ................. | B60R 11/00 296/24.34 |
| 7,823,949 B2* | 11/2010 | VandenHeuvel | ......... | B60R 7/04 296/1.08 |
| 8,007,020 B2* | 8/2011 | Hipshier | ................... | B60R 7/04 296/24.34 |
| 8,029,065 B2* | 10/2011 | Wieczorek | ........... | B60N 2/4646 297/411.35 |
| 8,100,454 B2* | 1/2012 | D'Alessandro | ........... | B60R 7/04 296/37.8 |
| 8,505,997 B2* | 8/2013 | Hipshier | .............. | B60N 2/4686 29/91.1 |
| 8,573,665 B2* | 11/2013 | Hipshier | ................ | B60Q 3/225 296/24.34 |
| 8,714,613 B1* | 5/2014 | Gillis | ........................ | B60R 7/04 296/24.34 |
| 8,939,491 B2* | 1/2015 | Gillis | ........................ | B60R 7/04 296/24.34 |
| 9,156,407 B1* | 10/2015 | Kramer | .................... | B60R 7/04 |
| 9,387,808 B2* | 7/2016 | Kearney | ................... | B60R 7/04 |
| 9,610,898 B2* | 4/2017 | Mather | .................... | B60R 7/04 |
| 2008/0079278 A1* | 4/2008 | Rajappa | ................... | B60R 7/04 296/24.34 |
| 2010/0045060 A1* | 2/2010 | Hipshier | ............... | B60N 2/4686 296/24.34 |
| 2010/0066113 A1* | 3/2010 | Browne | ............... | B60N 2/4646 296/24.34 |
| 2010/0072767 A1* | 3/2010 | D'Alessandro | ........... | B60R 7/04 296/24.34 |
| 2010/0078954 A1* | 4/2010 | Liu | ....................... | B60N 2/4686 296/24.34 |
| 2010/0156128 A1* | 6/2010 | Dexter | ................... | B60N 2/305 296/24.34 |
| 2012/0061983 A1* | 3/2012 | Seiller | .................... | B60R 11/00 296/24.34 |
| 2013/0134729 A1* | 5/2013 | Zimmerman | ............. | B60R 7/04 296/24.34 |

FOREIGN PATENT DOCUMENTS

| | | |
|---|---|---|
| JP | 2010-215194 A | 9/2010 |
| JP | 2013-542114 A | 11/2013 |
| JP | 2015-040038 A | 3/2015 |
| KR | 10-1439137 B1 | 9/2014 |
| KR | 10-2015-0032079 A | 3/2015 |

\* cited by examiner

INPUT APPARATUS FOR VEHICLE AND VEHICLE INCLUDING THE SAME

CROSS-REFERENCE TO RELATED APPLICATION

This application claims the benefit of priority to Korean Patent Application No. 10-2015-0094681, filed on Jul. 2, 2015 with the Korean Intellectual Property Office, the disclosure of which is incorporated herein by reference.

TECHNICAL FIELD

Embodiments of the present disclosure relate to an input apparatus for a vehicle and a vehicle including the same, and more specifically, to an input apparatus for vehicle including an openable cover, and a vehicle including the input apparatus for vehicle.

BACKGROUND

An input device for vehicle enables a user to interface with communication equipment through a display. As an input device for vehicle, a dial input device is widely used. Lately, a touch input device has been developed to interface with communication equipment through a user's operation of contacting or approaching a touch pad or a touch screen with an input tool, such as a finger or a touch pen.

The input device is generally fixed at a specific location inside a vehicle, and is always exposed to the air. Accordingly, foreign materials such as dust are accumulated on the input device, which may cause adverse operations of the input device. Also, when the input device is exposed to direct sunlight for a long time, discoloration might occur.

SUMMARY OF THE DISCLOSURE

Therefore, it is an aspect of the present disclosure to provide an input apparatus for vehicle capable of covering an input unit when a user does not use the input unit to prevent the input unit from getting dirty, and exposing the input unit when the user uses the input unit, and a vehicle including the input apparatus for vehicle.

Additional aspects of the disclosure will be set forth in part in the description which follows and, in part, will be obvious from the description, or may be learned by practice of the disclosure.

In accordance with one aspect of the present disclosure, an input apparatus for vehicle includes a cover member configured to cover the upper part of an input unit installed in a center plate provided between a driver seat and a passenger seat, wherein the cover member moves forward from a center console located in the back part of the center plate to cover the upper part of the input unit.

The cover member may be accommodated below an arm rest formed in the upper part of the center console.

The cover member may move through an opening formed in front of the center console to be accommodated in the center console.

The cover member may be guided by rails disposed in the center plate to move forward or backward.

When the cover member moves forward, a fore end of the cover member may contact the center plate to shield the upper part of the input unit.

The input apparatus may further include: a screw configured to rotate by power provided by a driver; and a nut member connected to the cover member, screw-coupled with the screw, and configured to move translationally in a forward/backward direction according to rotation of the screw.

The input apparatus may further include: a pinion gear configured to rotate by power provided by a driver; and a rack gear connected to the cover member, gear-coupled with the pinion gear, and configured to move translationally in a forward/backward direction according to rotation of the pinion gear.

The input apparatus may further include: a guide shaft extending in a direction in which the cover member moves; a moving member connected to the cover member, and guided by the guide shaft to move forward or backward; and an elastic member interposed between the moving member and one end of the guide shaft.

The input apparatus may further include: a fixing pin configured to fix the cover member when the cover member moves backward to open the upper part of the input unit, the fixing pin connected to one end of the cover member or the moving member, and a fixing pin catching member configured to catch the fixing pin.

The input unit may be movable in an up/down direction, be accommodated in the center plate when moved down, and protrude from a mounting surface when moved up.

The input unit may include a concave, curved area.

In accordance with another aspect of the present disclosure, a vehicle includes: the input apparatus for vehicle; and a controller configured to control opening/closing of the cover member according to a predetermined event.

The controller may control, when the vehicle starts, the cover member to be opened, or control, when the vehicle is turned off, the cover member to be closed.

The controller may control, when a controlled target that is controlled by the input unit is powered on, the cover member to be opened, and control, when the controlled target is powered off, the cover member to be closed.

The vehicle may further include: an arm rest formed in the upper part of the center console; and a proximity sensor installed around the arm rest, and configured to determine whether a user's arm is rested on the arm rest.

If it is determined that a user's arm is rested on the arm rest, the controller may control the cover member to be opened, and if it is determined that no user's arm is rested on the arm rest, the controller may control the cover member to be closed.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
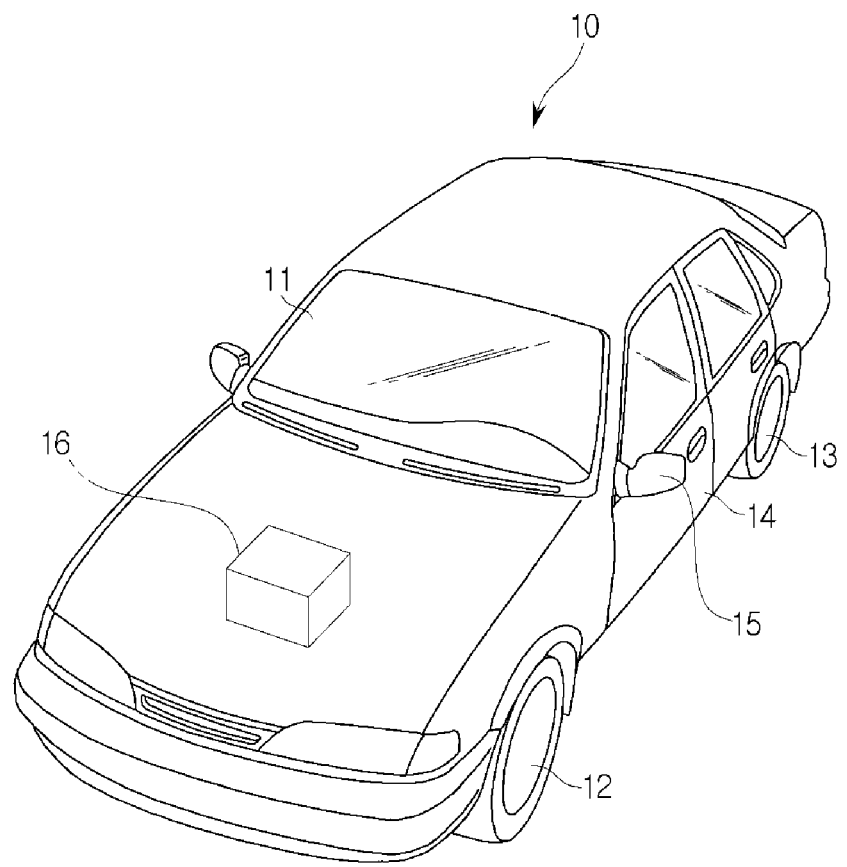
FIG. 1 shows an outer appearance of a vehicle according to an embodiment of the present disclosure.

Hereinafter, embodiments of the present disclosure will be described in detail with reference to the accompanying drawings. However, the embodiments disclosed in the present specification are just preferred examples of the present disclosure to sufficiently transfer the technical ideas of the present disclosure to one of ordinary skill in the art. Therefore, the present disclosure is not limited to the embodiments, so that various equivalents and modifications may be alternates of the embodiments. Also, for convenience of description, some components irrelevant to the present disclosure may be not shown in the drawings, and some components may be more or less exaggeratedly shown.

FIG. 1 shows an outer appearance of a vehicle according to an embodiment of the present disclosure. Herein, the vehicle includes various kinds of mechanical equipment that can transport humans, goods, or animals from a departure point to a destination. For example, the vehicle may be an automobile to travel on roads or rails, a ship to travel by sea or river, or a plane to fly in the sky using the action of air.

Also, an automobile traveling on a road or rail can move in a predetermined direction according to the rotations of at least one wheel. The automobile may be a three- or four-wheeled vehicle, construction machinery, a two-wheeled vehicle, a prime mover bicycle, a bicycle, and/or a train travelling along rails.

Referring to FIG. 1, a vehicle according to an embodiment of the present disclosure may include a main body 10 forming an outer appearance of the vehicle, a plurality of wheels 12 and 13 to move the vehicle, a driving apparatus 16 to rotate the wheels 12 and 13, a plurality of doors 14 to shield the inside of the vehicle from the outside, a front glass 11 to provide a driver inside the vehicle with a front view of the vehicle, and a plurality of side-view mirrors 15 to provide the driver with the rear and side views of the vehicle.

The main body 10 may include a hood, front fenders, a roof panel, the doors 14, a trunk lid, and quarter panels.

The wheels 12 and 13 may include front wheels 12 provided in the front part of the vehicle, and rear wheels 13 provided in the rear part of the vehicle. The driving apparatus 16 may provide rotatory power to the front wheels 12 or the rear wheels 13 to move the main body 10 forward or backward. The driving apparatus 16 may adopt an engine to burn fossil fuels to produce rotatory power, or a motor to receive power from a condenser or a battery (not shown) to produce rotatory power.

The doors 14 may be rotatably provided in the left and right sides of the main body 10 to allow the driver to open one of them and get into the vehicle. Also, the doors 14 may shield the interior of the vehicle from the outside when all of them close.

The front glass 11 may be provided in the upper, front part of the main body 10 to allow the driver inside the vehicle to acquire a front view of the vehicle. The front glass 11 is also called a windshield glass.

Also, a plurality of side windows may be provided in the respective doors 14, that is, in the left and right sides of the main body 10, and a rear window may be provided in the rear part of the main body 10.

The side-view mirrors 15 may include a left side-view mirror provided in the left side of the main body 10 and a right side-view mirror provided in the right side of the main body 10 to allow the driver inside the vehicle to acquire side and rear views of the vehicle.

In addition, the vehicle may include sensors, such as a proximity sensor to sense an obstacle or another vehicle behind or beside the vehicle, and a rain sensor to determine if it rains and to sense an amount of rainfall.

The proximity sensor may emit a sensing signal from the side or rear part of the vehicle, and receive a reflection signal reflected from an obstacle such as another vehicle to detect any obstacle behind the vehicle and detect the location of a found obstacle, based on the waveform of the received reflection signal. As such, the proximity sensor may adopt a method of emitting ultrasonic waves, and measuring a distance to an obstacle based on the ultrasonic waves reflected from the obstacle.

Figure 2:
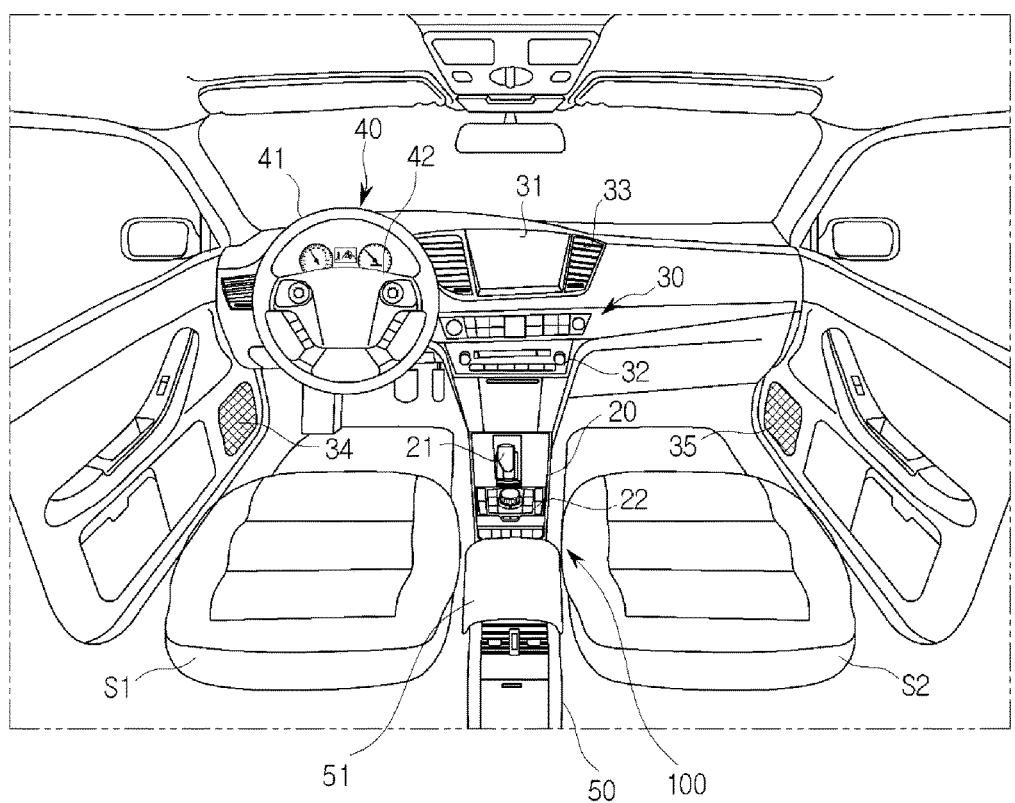
FIG. 2 shows an interior of a vehicle according to an embodiment of the present disclosure.

FIG. 2 shows the interior of a vehicle according to an embodiment of the present disclosure.

Referring to FIG. 2, the interior of the vehicle may provide a plurality of seats S1 and S2 in which passengers sit, and a dashboard on which a center plate 20, a center fascia 30, and a steering wheel 30 are arranged.

The seats S1 and S2 may enable a driver to operate the vehicle in his/her comfortable, stable position, and include a driver seat S1 in which the driver sits, and a passenger seat S2 located in the front area inside the main body 10, together with the driver seat S1.

In the center fascia 30, an air conditioner 33, a clock, an audio system 32, and a navigation system 31 may be installed.

The air conditioner 33 may adjust the temperature, humidity, air quality, and flow of air inside the vehicle to maintain environmental conditions inside of the vehicle. The air conditioner 33 may be installed in the center fascia 30, and may include at least one vent for discharging air. In the center fascia 30, at least one button or dial for controlling the air conditioner 33, etc. may be provided. A driver or passenger may use the button provided on the center fascia 30 to control the air conditioner 33.

According to an embodiment, the navigation system 31 may be located in the center fascia 30. The navigation system 31 may be embedded into the center fascia 30 of the vehicle, or protrude from the upper surface of the dashboard. According to an embodiment, an input unit to control the navigation system 31 may be mounted on the center fascia 30. However, according to another embodiment, the input unit of the navigation system 31 may be positioned at another location, instead of the center fascia 30. For example, the input unit of the navigation system 31 may be positioned around the display of the navigation system 31. As another example, the input unit of the navigation system 31 may be positioned on the center plate 20.

The audio system 32 may include an operating panel on which a plurality of buttons that perform various functions is arranged. The audio system 32 may provide a radio mode to provide a radio function, and a media mode to reproduce an audio file stored in storage medium that stores audio files. The buttons arranged on the operating panel of the audio system 32 may be classified into buttons to provide functions related to execution of the radio mode, buttons to provide functions related to execution of the media mode, and buttons that are used in common in the radio mode and the media mode.

The audio system 32 may output sound through speakers 34, 35, 61, and 62 installed in the inside of the main body 10. The speakers 34, 35, 61, and 62 may include a speaker 34 installed in the left door located to the left of the driver seat S1, a speaker 35 installed in the right door located to the right of the passenger seat S2, and a plurality of speakers 61 and 62 located around a back seat.

The steering wheel 40 may be used to change a driving direction of the vehicle. The steering wheel 40 may include a rim 41 that is gripped by a driver, and a spoke 42 connected to a steering apparatus of the vehicle and connecting the rim 41 to a hub of a rotation axis for steering. According to an embodiment, the spoke 42 may include an operating unit to control various devices of the vehicle, for example, the audio system 32.

Also, the dash board located in front of the steering wheel 40 may include an instrument panel to inform the driver of various information, such as speed, mileage, Revolutions Per Minute (RPM), fuel status, a temperature of cooling water, and warnings during driving, and may further include a globe box to contain small things.

Figure 3:
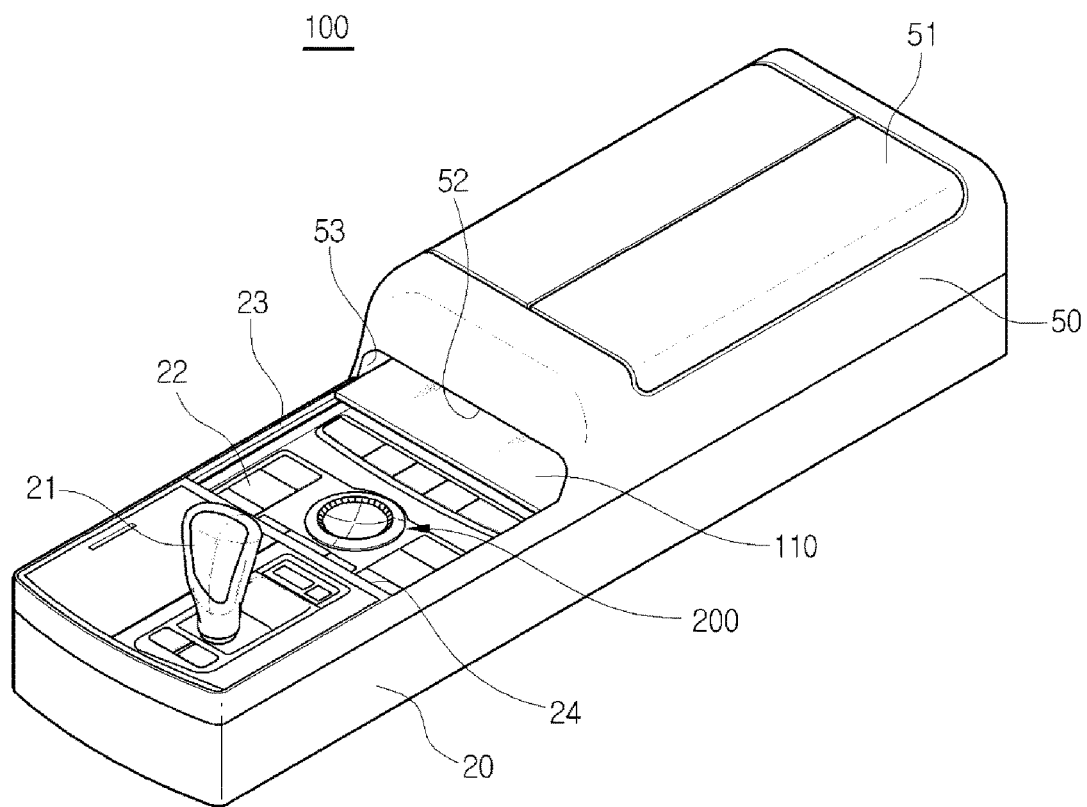
FIG. 3 is a perspective view of an input apparatus for a vehicle according to an embodiment of the present disclosure.

FIG. 3 is a perspective view of an input apparatus 100 for a vehicle according to an embodiment of the present disclosure.

The input apparatus 100 for vehicle may include an input unit 200 mounted on the center plate 20, and a cover member 110 configured to cover the input unit 200 as necessary.

The center plate 20 may be located between the driver seat S1 and the passenger seat S2. The front part of the center plate 20 may connect to the center fascia 30, and the rear part of the center plate 20 may connect to the center console 50. In FIG. 2, a case in which the center plate 20 and the center console 50 are integrated into one body is shown, however, the center plate 20 may be separated from the center console 50.

In the center plate 20, a gear 21 for power transmission, and various transmission-related components may be installed or embedded. Also, as shown in FIG. 2, various input units to enable a user to control execution of the navigation system 31 or the main functions of the vehicle may be installed in the center plate 20.

The center plate 20 may include various input units as described above. More specifically, the center plate 20 may include a plurality of buttons 22 to execute designated functions. For example, the buttons 22 may be provided to execute the navigation system 31, the audio system 32, or the air conditioner 33 or to perform the functions of the navigation system 31, the audio system 32, or the air conditioner 33.

Meanwhile, it is also possible to perform various functions through a single input unit in order to achieve an aesthetic design and unified operations. For example, the input unit may be a dial input unit or a touch input unit 200. The dial input unit may be implemented as a knob type that can be gripped by a users hand and can rotate, and the touch input unit 200 may include a touch pad in the upper surface.

Also, various buttons 22 for assisting the functions of the dial input unit or the touch input unit 220 or for performing independent functions may be provided around the dial input unit or the touch input unit 220. For example, the dial input unit or the touch input unit 200 may connect to displays in the vehicle so as to enable a user to select any one(s) of various icons that are displayed on the displays.

Also, in the center plate 20, a display unit may be provided as necessary. The display unit may be connected to a Head Up Display (HUD) or a back mirror.

More specifically, the input unit may move a cursor displayed on the display unit or execute any one of icons displayed on the display unit. The icons may include a main menu, a selection menu, and a setting menu. Also, the input unit may enable the user to operate the navigation system 31, to set operating conditions of the vehicle, or to execute peripheral devices of the vehicle.

The center console 50 may be provided in the rear part of the center plate 20, and include storage space therein. Also, in the upper part of the center console 50, an arm rest 51 on which the driver can put his/her arm may be disposed. For example, the driver may shift the gear 21, press the button input unit 22, or operate the dial input unit or the touch input unit 200, while putting his/her arm on the arm rest 51.

The arm rest 51 may be fabricated with a soft or elastic material to provide the user with comfort. Also, the outer surface of the arm rest 51 may be covered with leather for a luxurious outer appearance.

Meanwhile, the input apparatus 100 according to an embodiment of the present disclosure may be installed in a backseat center plate (not shown) of the vehicle, as not shown in the drawings. The backseat center plate may be positioned generally between a left backseat (not shown) and a right backseat (not shown) of the vehicle. Also, a cup holder or an input unit such as various buttons may be provided to improve passengers' convenience.

The input apparatus 100 for a vehicle according to an embodiment of the present disclosure may include a cover member 110 configured to cover the input unit 200, according to a first embodiment of the present disclosure. The cover member 110 may move forward or backward in the center plate 20. For example, the cover member 110 may move forward from the rear part of the input unit 200 to cover the input unit 200, or move backward from the front part of the input unit 200 to open the input unit 200.

The cover member 110 according to the first embodiment of the present disclosure may be accommodated in the center console 50. The center console 50 may generally include storage space. For example, the arm rest 51 may open to expose the storage space. The input apparatus 100 for vehicle according to the current embodiment of the present disclosure may provide space 52 in which the cover member 110 can be accommodated inside the center console 50, and provide opening 53 in which the cover member 110 can move forward or backward in front of the center console 50, wherein the opening 53 communicates with the space 52. That is, the cover member 10 may be accommodated in the internal space 52 of the center console 50 when the user uses the input unit 200, and when the user does not use the input unit 200, the cover member 110 may move forward to cover the input unit 200.

Also, in the center plate 20, rails 23 may be disposed to guide movement of the cover member 110. For example, the rails 23 may support both lateral sides of the cover member 110 to enable the cover member 110 to move forward or backward.

Also, the center plate 20 may include a shielding member 24 to closely contact the fore end of the cover member 110 to shield the input unit 200 from the outside. That is, if the cover member 110 moves forward to reach the shielding member 24, both lateral sides of the cover member 110 may closely contact the rails 23, and the fore end of the cover member 110 may closely contact the shielding member 24 so as to shield the input unit 200 from the outside. Accordingly, foreign materials such as dust may be prevented from getting in the input unit 200.

An operation method of the cover member 110 will be described later.

Hereinafter, the input unit 200 according to a first embodiment of the present disclosure will be described with reference to FIGS. 4 to 6.

Figure 4:
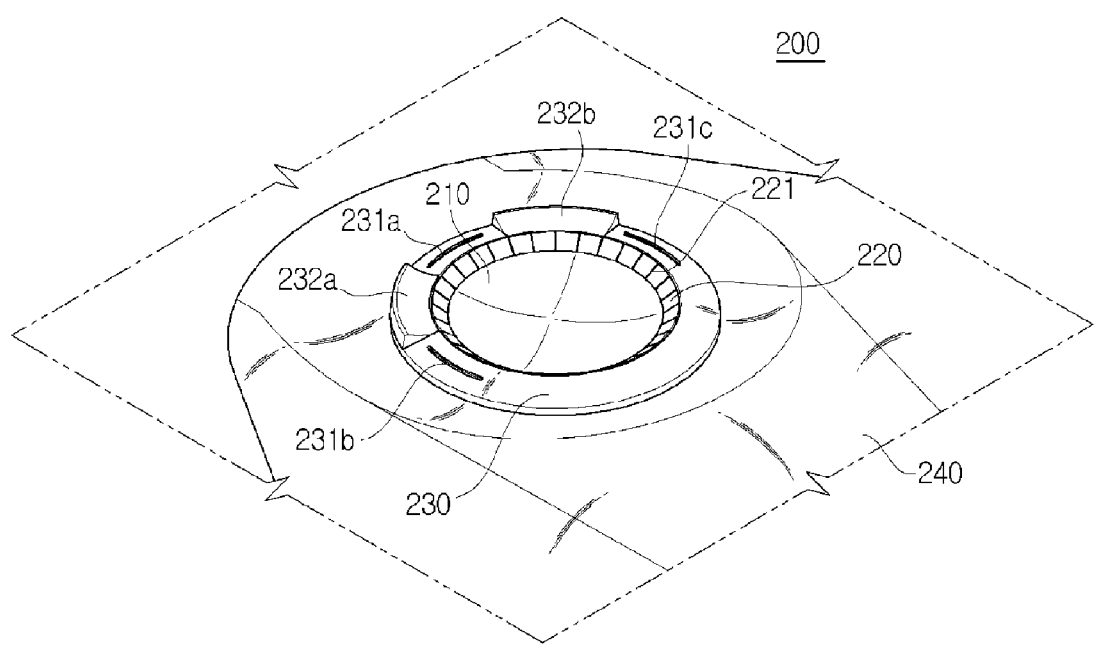
FIG. 4 is a perspective view of an input unit according to a first embodiment of the present disclosure.
Figure 5:
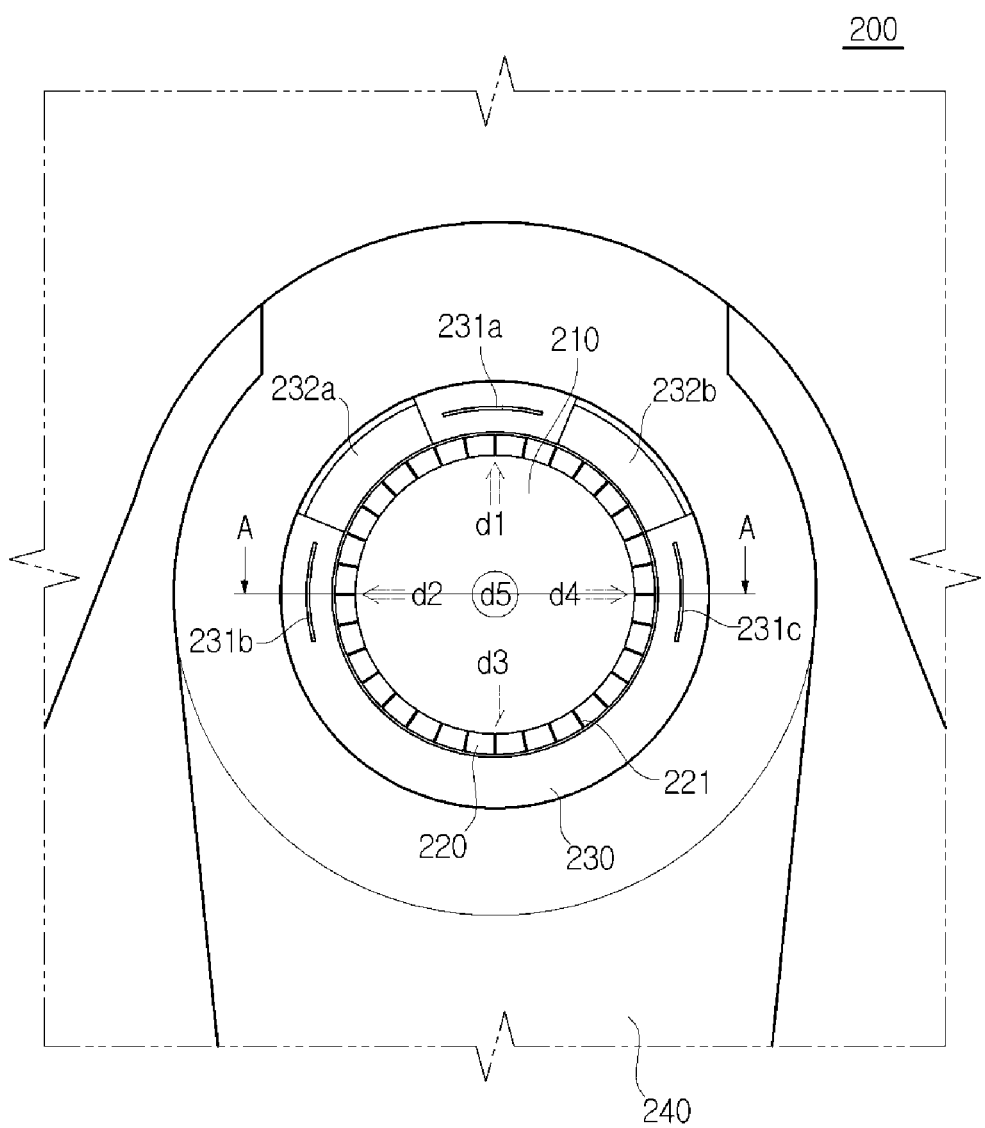
FIG. 5 is a view for describing a method of operating the input unit according to the first embodiment of the present disclosure.
Figure 6:
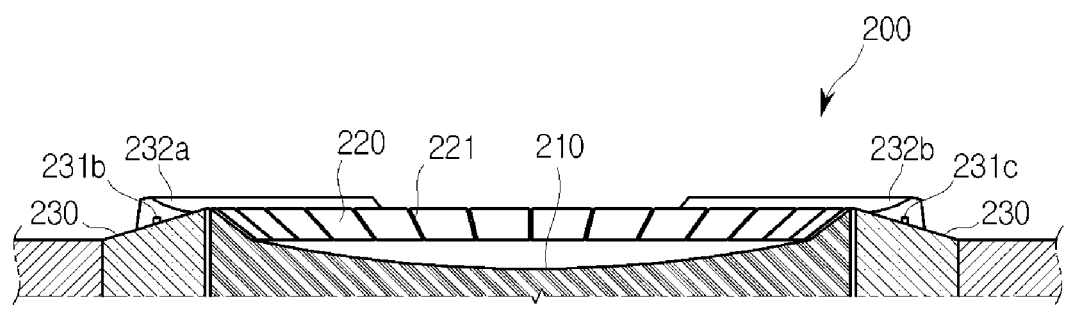
FIG. 6 is a cross-sectional view of the input unit of FIG. 5 cut along a line A-A.

FIG. 4 is a perspective view of the input unit 200 according to the first embodiment of the present disclosure, FIG. 5 is a view for describing a method of operating the input unit 200 according to the first embodiment of the present disclosure, and FIG. 6 is a cross-sectional view of the input unit 200 of FIG. 5 cut along a line A-A.

Referring to FIG. 4, the input unit 200 according to the first embodiment of the present disclosure may include touch sections 210 and 220 to detect a touch signal generated by a user's touch operation, and a border section 230 surrounding the touch sections 210 and 220.

The touch sections 210 and 220 may be a touch pad to generate a signal when a user contacts or approaches it (210, 220) with a pointer, such as his/her finger or a touch pen. The user may make a predetermined touch gesture on the touch sections 210 and 220 to input a desired instruction or command.

The touch pad may be a touch film or a touch sheet including a touch sensor, regardless of its name. Also, the touch pad may be a touch panel which is a display unit capable of detecting a touch operation on a screen.

Meanwhile, a touch operation of making a pointer approach a touch pad so as for the pointer to be at the proximity of the touch pad without being in contact with the touch pad in order to recognize the location of the pointer is called "proximity touch", and a touch operation of making a pointer contact a touch pad in order to recognize the location of the pointer is called "contact touch". The location of a pointer at which proximity touch is recognized may be a location at which the pointer approaches a touch pad to be vertical to the touch pad.

The touch pad may be a resistive type touch pad, an optical type touch pad, a capacitive type touch pad, an ultrasonic type touch pad, or a pressure type touch pad. That is, the touch pad may be one of various kinds of touch pads well-known in the art.

The border section 230 surrounding the touch sections 210 and 220 may be provided as a separate member from the touch sections 210 and 220. In the border section 230, one or more key buttons 232a and 232b or one or more touch buttons 231a, 231b, and 231c may be arranged to surround the touch sections 210 and 220. Accordingly, the user may make a gesture on the touch sections 210 and 220, or input a signal using the buttons 231 and 232 arranged in the border section 230 around the touch sections 210 and 220.

The input unit 200 according to the first embodiment of the present disclosure may further include a wrist supporting part 240 located below the border section 230 to support the users wrist. The wrist supporting part 240 may be positioned higher than the touch sections 210 and 220. Since the wrist supporting part 240 is positioned higher than the touch sections 210 and 220, the wrist supporting part 240 may prevent the user's wrist from being bent, when the user makes a gesture on the touch sections 210 and 220 with his/her finger while putting his/her wrist on the wrist supporting part 240. Accordingly, the wrist supporting part 240 may protect the user from musculoskeletal system disorders, while offering a good operation feeling.

The touch sections 210 and 220 may include an area that is lower than the boundary line with the border section 230. That is, the touch surfaces of the touch sections 210 and 220 may be lower than the boundary line with the border section 230. For example, the touch surfaces of the touch sections 210 and 220 may be tilted downward from the boundary line with the border section 230, or the touch surfaces of the touch sections 210 and 220 may have a step with respect to the boundary line with the border section 230.

Since the touch sections 210 and 220 include an area lower than the boundary line with the border section 230, the user can identify the area of the touch sections 210 and 220 and the boundary line with his/her tactile impression. The center area of the touch sections 210 and 220 may have a high detection rate with respect to gestures.

However, when the user made similar gestures at different locations, there is a risk that the gestures are recognized as different commands. The problem may occur when the user makes a gesture without fixing his/her eyes at the touch sections 210 and 220. Accordingly, if the user can intuitively identify the touch sections 210 and 220 and the boundary line with his/her tactile impression when he/she makes a gesture while seeing the display unit or focusing his/her attention on an external situation, the user will be able to make a gesture at an exact location. This will improve the accuracy of a gesture input.

The touch sections 210 and 220 may include a concave area. Herein, the term "concave" means a hollow or depressed shape, and may also include a tilted or stepped shape, as well as a round depressed shape.

For example, the touch sections 210 and 220 may include a concave, curved area 210. The curved area 210 of the touch sections 210 and 220 according to the first embodiment of the present disclosure may be a concave, curved surface having a predetermined curvature. Meanwhile, the concave, curved surface of the touch sections 210 and 220 may have different curvatures according to area. For example, the center area of the concave, curved surface may have a relatively small curvature (a small radius of curvature), and the outer area of the concave, curved surface may have a relatively great curvature (a great radius of curvature).

Figure 7:
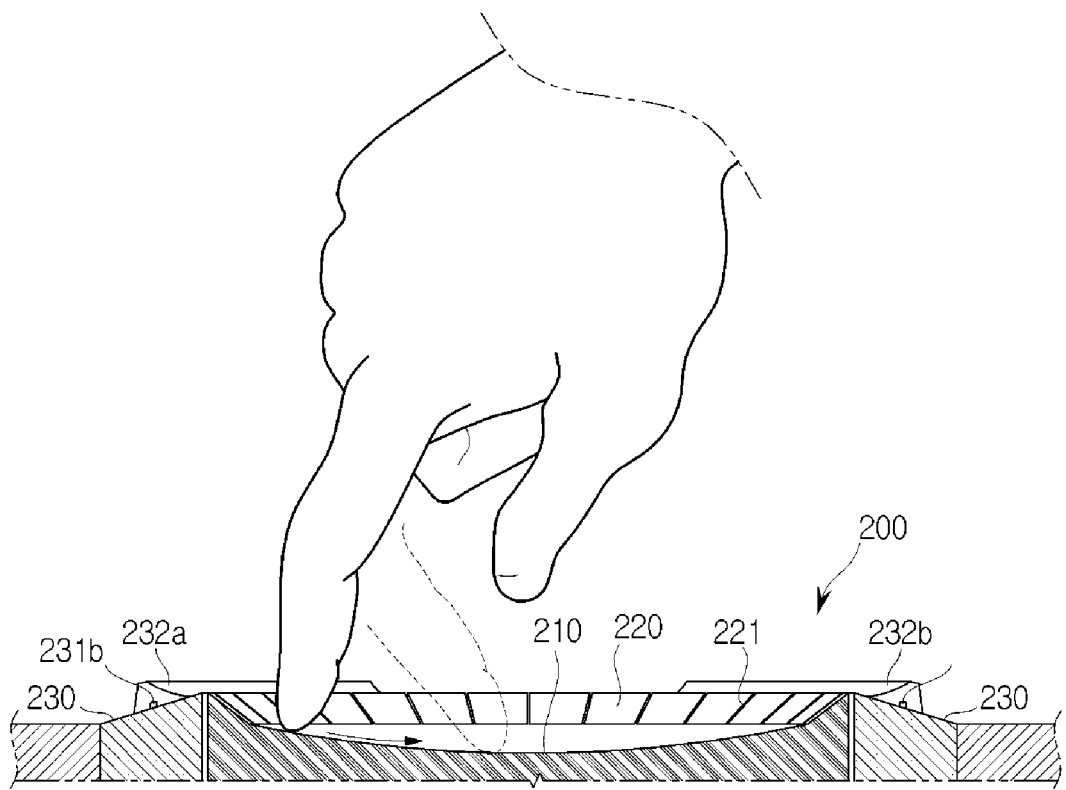
FIG. 7 is a cross-sectional view of the input unit of FIG. 5 when a user makes a gesture on the input unit.

FIG. 7 is a cross-sectional view of the input apparatus 200 when a user makes a gesture on the input apparatus 200.

As shown in FIG. 7, since the touch section 210 and 220 include the concave, curved surface, the user can feel improved touch sensation when making a gesture on the touch sections 210 and 220. The curved surface of the touch section 210 may similarly correspond to a trajectory drawn by a user fingertip's movement occurring when the user moves his/her finger while fixing his/her wrist or when the user rotates or twists his/her wrist while spreading out his/her fingers.

Compared to a conventional flat-type touch input unit, the touch sections 210 and 220 having the concave, curved surface according to the current embodiment may be ergonomically designed. That is, the touch sections 210 and 220 having the concave, curved surface can reduce fatigue that is applied to the user's wrist, while improving the users touch sensation. In addition, the touch sections 210 and 220 enable the user to accurately make a gesture, compared to when the user makes a gesture on a flat-type touch input unit.

Also, the touch sections 210 and 220 may have a circular shape. If the touch sections 210 and 220 have a circular shape, it may be easy to form a concave, curved area in the touch sections 210 and 220. Also, if the touch sections 210 and 220 have a circular shape, the user can easily identify the touch area of the touch sections 210 and 220 with his/her tactile feeling so as to easily make rolling or spin operations.

Also, since the touch sections 210 and 220 are curved, the user can intuitively recognize which location of the touch sections 210 and 220 his/her finger is positioned at. Also, if the touch sections 210 and 220 are curved, all points of the touch sections 210 and 220 may have different gradients. Accordingly, the user can intuitively recognize which location of the touch section 110 his/her finger touches, through a sense of gradient felt by the finger. That is, the curved shape of the touch sections 210 and 220 can provide the user with a feedback about which location of the touch sections 210 and 220 his/her finger touches, when the user makes a gesture on the touch sections 210 and 220 while fixing his/her eyes at some other place instead of the touch sections 210 and 220, thereby helping the user make his/her desired gesture and improving the accuracy of gesture inputs.

Meanwhile, the touch pad of the touch sections 210 and 220 having the curved surface may recognize a touch gesture using an optical method. For example, on the rear part of the touch sections 210 and 220 having the curved surface, an Infrared Light Emitting Diodes (IR LEDs) and photodiodes array may be disposed. The IR LEDs and the photodiodes may acquire an infrared image reflected from a finger, and a controller may extract touch points from the acquired infrared image.

Also, the touch sections 210 and 220 may be ergonomically designed in view of diameter and depth. For example, the diameter of the touch sections 210 and 220 may range from 51 mm to 80 mm.

A length to which an adult can move his/her finger naturally without moving his/her wrist may be about 80 mm in consideration of an adult's average finger length. Accordingly, if the diameter of the touch sections 210 and 220 exceeds 80 mm, the user may have to move his/her hand unnaturally and move his/her wrist more than necessary, when drawing a circle on the touch section 220.

In contrast, if the diameter of the touch sections 210 and 220 is smaller than 51 mm, the touch area of the touch sections 210 and 220 is reduced, resulting in difficulties in making various gestures on the touch area. Also, when a gesture is made on the small touch area, the probability that the gesture will be wrongly recognized will increase.

Also, when the touch sections 210 and 220 have a spherical shape, a ratio of the depth with respect to the diameter of the touch sections 210 and 220 may range from 0.04 to 0.1. A value obtained by dividing the depth of the touch sections 210 and 220 by the diameter of the touch sections 210 and 220 represents a curvature of the touch sections 210 and 220. That is, as the ratio of the depth with respect to the diameter of the touch sections 210 and 220 is greater, the more curved the touch sections 210 and 220 appear, and as the ratio of the depth with respect to the diameter of the touch sections 210 and 220 is smaller, the more flat the touch sections 210 and 220 appear.

If the ratio of the depth with respect to the diameter of the touch sections 210 and 220 is greater than 0.1, a curvature of the concave area may increase, which may degrade the user's touch sensation. The curvature of the concave area of the touch sections 210 and 220 may be preferably identical to the curvature of a curve drawn by a user's fingertip when the user moves his/her finger naturally. However, if the ratio of the depth with respect to the diameter of the touch sections 210 and 220 is greater than 0.1, a user may have to flex his/her finger more than necessary when moving the finger along the curved surface of the touch sections 210 and 220, which may make the user sense an artificial operating feeling. Also, when the user moves his/her finger unconsciously, the user's fingertip may be taken off the curved surface of the touch sections 210 and 220. In this case, the users gesture may be wrongly recognized.

Meanwhile, if the depth of the touch sections 210 and 220 is too low, the user will be not able to obtain the advantage of the curved surface, compared to a flat surface. If the ratio of the depth with respect to the diameter of the touch sections 210 and 220 is smaller than 0.04, the user will be not able to feel a difference in operation sensation, compared to when making a gesture on a flat type touch input unit.

The touch sections 210 and 220 according to the current embodiment may include a tilted section 220 tilted along the circumference of the curved area (that is, the touch section 210). If the touch sections 210 and 220 have a circular shape, the curved section 210 may be a part of a spherical surface, and the tilted section 220 may surround the circumference of the curved section 210.

The curved section 210 may function as a gesture input section, and the tilted section 220 may function as a swiping input section. Hereinafter, the curved section 210 will be referred to as a gesture input section 210, and the tilted section 220 will be referred to as a swiping input section 220.

The user may make a swiping gesture along the swiping input section 220 formed in the shape of a ring. More specifically, the user may make a swiping gesture clockwise or counterclockwise along the swiping input section 220.

Meanwhile, swiping gestures may be recognized depending on points at which the swiping gestures start and end. That is, a swiping gesture made on an area of the swiping input section 220 located to the left of the gesture input section 210 and a swiping gesture made on another area of the swiping input section 220 located to the right of the gesture input section 210 may cause different operations.

Meanwhile, swiping gestures ending at different points may be recognized as different gestures although the swiping gestures have started at the same point. That is, gestures may be recognized depending on locations at which a user takes his/her finger off.

Also, the swiping input section 220 may recognize a tap gesture. That is, the swiping input section 220 may issue different commands or instructions depending on locations at which the user taps the swiping input section 220.

The swiping input section 220 may include gradations 221. The gradations 221 may visually or tactilely inform the user of a relative location. For example, the gradations 221 may be embossed or engraved. The gradations 221 may be arranged at regular intervals. Accordingly, the user can intuitively recognize the number of gradations through which his/her finger passes while making a swiping operation so as to accurately adjust the length of the swiping gesture.

According to an embodiment, a cursor that is displayed on the display unit (see FIG. 2) may move according to the number of gradations 221 through which a finger passes when a swiping gesture is made. If the user makes a swiping gesture when various selected characters were successively displayed on the display unit, a selected character may move to the right by a space whenever the users finger passes through a gradation 221.

Also, a gradient of the swiping input section 220 may be greater than a gradient of the gesture input section 210 at a boundary line between the swiping input section 220 and the gesture input section 210. Since the swiping input section 220 is more steeply titled than the gesture input section 210, the user may intuitively identify the gesture input section 210 when making a gesture on the gesture input section 210. Meanwhile, while a gesture is made on the gesture input section 210, no touch input applied on the swiping input section 220 may be recognized. Accordingly, when the user makes a gesture on the gesture input section 210 until reaching the boundary line with the swiping input section 220, the gesture input made on the gesture input section 210 may not overlap with any swiping gesture input made on the swiping input section 220.

Meanwhile, the swiping input section 220 may be integrated into the gesture input section 210. Also, a plurality of touch sensors may be respectively installed in the gesture input section 210 and the swiping input section 220, or a touch sensor may be installed in the gesture input section 210 and the swiping input section 220. If the gesture input section 210 and the swiping input section 220 include a touch sensor, the controller 400 may distinguish the touch area of the gesture input section 210 from the touch area of the swiping input section 220 to distinguish a signal generated in correspondence to a touch input applied on the gesture input section 210 from a signal generated in correspondence to a touch input applied on the swiping input section 220.

The input unit 200 may further include one or more buttons 231 and 232, as described above. The buttons 231 and 232 may be arranged around the touch sections 210 and 220. The user can manipulate the buttons 231 and 232 without moving his/her hand when making a gesture, so that the user can issue an operation command quickly.

The buttons 231 and 232 may include one or more touch buttons 231a, 231b, and 231c to perform a designated function according to the user's touch input, and one or more pressure buttons 232a and 232b to change its position according to pressure applied by the user to perform a designated function. When the touch buttons 231a, 231b, and 231c are used, the buttons 231 and 232 may include touch sensors.

The pressure buttons 232a and 232b may slide in an up-down direction or forward-backward direction by an external force. The user may pull or push one of the pressure buttons 232a and 232b to input a signal. Also, a signal that is input when the user pulls any one of the pressure buttons 232a and 232b may be different from a signal that is input when the user pushes any one of the pressure buttons 232a and 232b.

In the drawings, five buttons 231 and 232 are shown. For example, the buttons 231 and 232 may include a Home button 231a to return to a home menu, a Back button 231b to return to the previous screen, an Option button 231c to move to an Option menu, and two shortcut buttons 232a and 232b. The shortcut buttons 232a and 232b may be used to jump directly to a designated menu or device that a user often uses.

According to an embodiment, the touch buttons 231a, 231b, and 231c may be disposed around the gesture input section 210, and the pressure buttons 232a and 232b may be positioned between the touch buttons 231a, 231b, and 231c. As such, since the pressure buttons 232a and 232b are interposed between the touch buttons 231a, 231b, and 231c, the user can be prevented from contacting the touch buttons 231a, 231b, and 231c unintentionally when pressing any one of the pressure buttons 232a and 232b.

Meanwhile, although not shown in the drawings, the input unit 200 may install various operation-related components therein. The input unit 200 may include a structure to enable the touch sections 210 and 220 to be pressed or tilted in five directions d1 to d5.

Also, in the input unit 200, various semiconductor chips and a printed circuit board (PCB) may be installed. The semiconductor chips may be packaged on the PCB. The semiconductor chips may perform data processing or store data. The semiconductor chips may interpret a predetermined electrical signal created according to an external force applied to the input unit 200, a gesture recognized by the touch sections 210 220, or operation applied to any one of the buttons 231 and 232 mounted on the input unit 200, create a predetermined control signal according to the result of the interpretation, and then transfer the predetermined control signal to a controller or a display of another apparatus.

The input unit 200 according to the first embodiment of the present disclosure may include a controller to recognize a gesture made on any one of the touch sections 210 and 220, to analyze the recognized gesture, and to transfer a predetermined command to a designated device according to the result of the analysis.

The controller may move a cursor or a menu on the display unit according to a movement of a pointer on the touch sections 210 and 220. That is, if the pointer moves from up to down, the controller may move a cursor from up to down on the display unit, or may move a preliminarily selected menu from the upper menu to the lower menu.

Also, the controller may analyze a trajectory along which the pointer moves to correspond the analyzed trajectory to a pre-defined gesture, and execute a command corresponding to the gesture. The gesture may be made upon the pointers flicking, rolling, spinning, or tapping. Also, the user may make a gesture using one of various touch input methods.

Flicking means a touch input method of touching the touch sections 210 and 220 with a pointer, dragging the pointer in a predetermined direction, and then taking the pointer off the touch sections 210 and 220, the rolling means a touch input method of drawing a circular arc with respect to the center of the touch sections 210 and 220, the spinning means a touch input method of drawing a circle with respect to the center of the touch sections 210 and 220, and the tapping means a touch input method of tapping the touch sections 210 and 220.

Also, the user may make a gesture using a multi-pointer input method. The multi-pointer input method is to make a gesture by simultaneously or sequentially touching the touch sections 210 and 220 with two pointers. For example, the user may make a gesture by touching the touch sections 210 and 220 with his/her two fingers. By using the multi-pointer input method in addition to a single-pointer input method, the user can make various gestures to issue various commands or instructions.

Also, the user may draw a character, a figure, a symbol, etc. to make a gesture. For example, the user may draw consonants/vowels of Hangul, alphabets, Arabic numerals, or symbols of four arithmetical operations. Since the user can himself/herself input characters or numerals that he/she wants to input, it is possible to reduce a time taken to input characters or numerals and to provide a more intuitive interface.

The touch sections 210 and 220 may allow a pressing operation or a tilting operation. The user may apply pressure to the touch sections 210 and 220 to press or tilt a part of the touch sections 210 and 220 to thereby input an execution signal. The pressing operation may include operations of pressing the touch sections 210 and 220 evenly, and operations of pressing the touch sections 210 and 220 obliquely.

For example, the touch sections 210 and 220 may be tilted in at least one direction d1 to d4 with respect to its central axis. For example, as shown in FIG. 5, the touch sections 210 and 220 may be tilted in up, down, left, and right directions d1 to d4. However, the touch sections 210 and 220 may be tilted in other various directions. Also, when the center area d5 of the touch sections 210 and 220 is pressed, the touch sections 210 and 220 may be pressed evenly.

The user may apply pressure to the input unit 200 to press or tilt the input unit 200 to thereby input a predetermined instruction or command. For example, the user may press the center area d5 of the touch sections 210 and 220 to select a menu, and may press the upper area d1 of the touch sections 210 and 220 to move the cursor upward.

As described above, since the input unit 200 is fixed at a specific location, the input unit 200 may be always exposed to the outside so that foreign materials such as dust in the air may be accumulated on the input unit 200. Furthermore, since the input unit 200 according to the current embodiment has a concave shape, it may be not easy to remove foreign materials accumulated on the touch sections 210 and 220. Also, in the space between the buttons 221 provided in the border section 230, the boundary line between the touch sections 210 and 220 and the border section 230, etc., foreign materials may be easily accumulated.

Accordingly, the input unit 200 according to the current embodiment may include a structure capable of preventing foreign materials from getting into the input unit 200. Hereinafter, a structure capable of preventing foreign materials from getting into the input unit 200 will be described.

Figure 8:
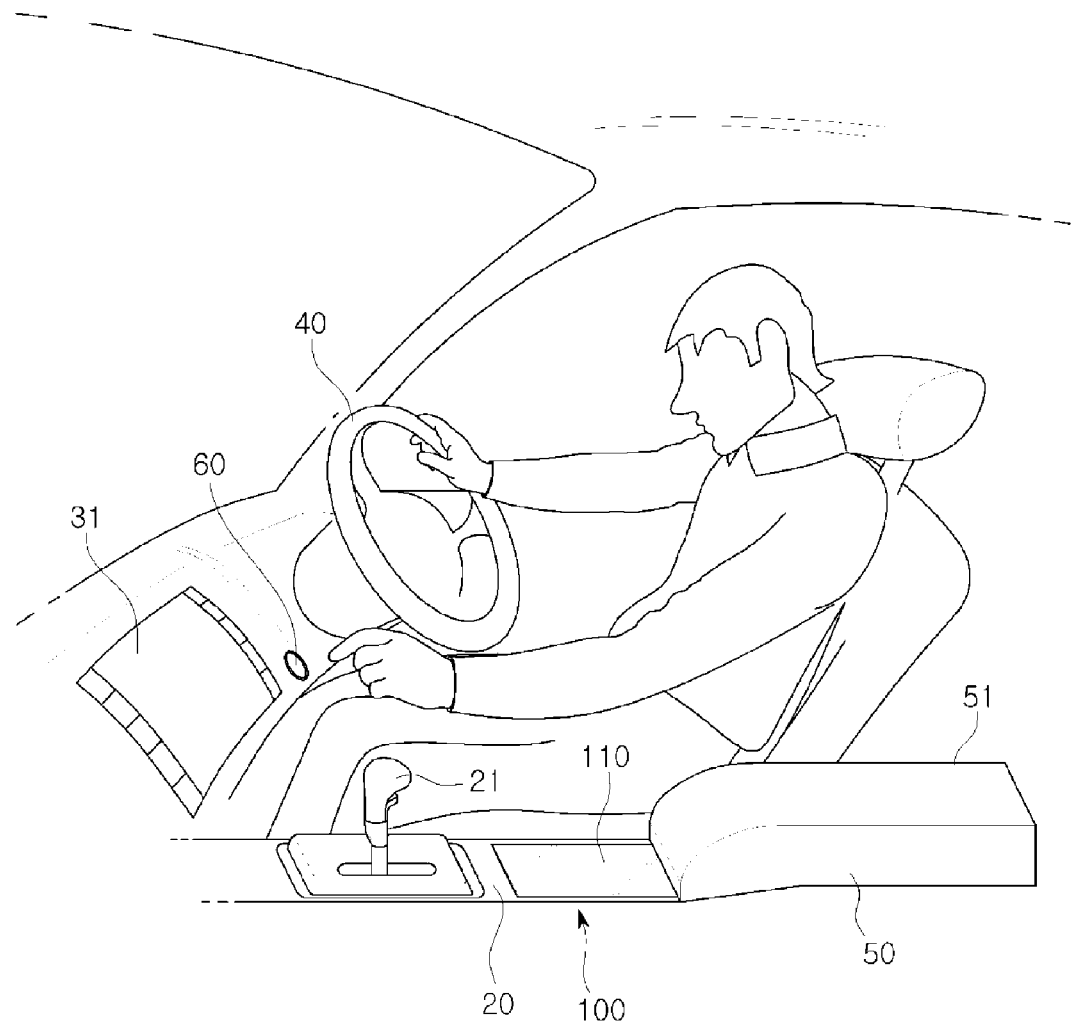
FIG. 8 is a side view of a cover member according to a first embodiment of the present disclosure when the cover member covers an input unit.
Figure 9:
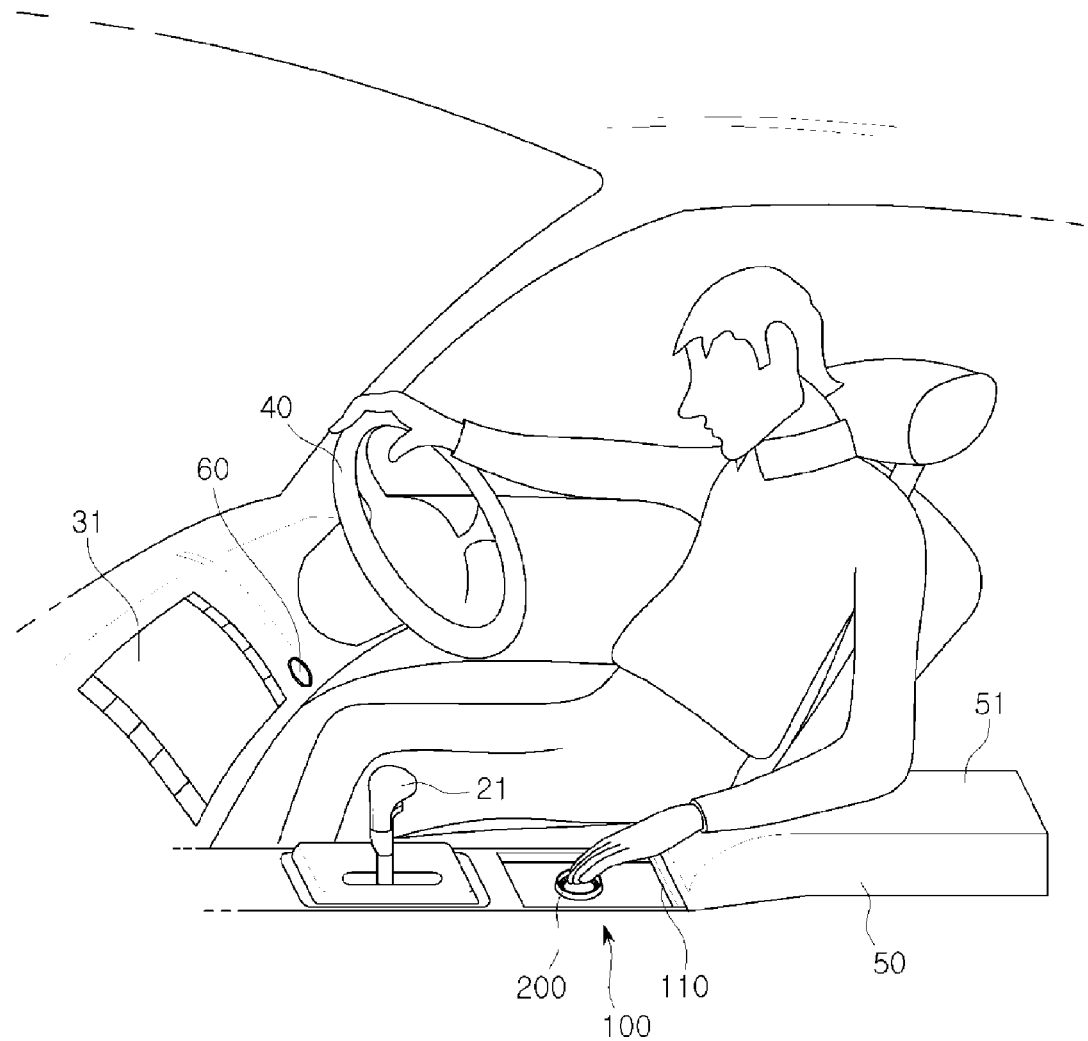
FIG. 9 is a side view of the cover member according to the first embodiment of the present disclosure when the cover member opens the input unit.

FIG. 8 is a side view of the cover member 110 according to a first embodiment of the present disclosure when the cover member 110 covers the input unit 200, and FIG. 9 is a side view of the cover member 110 according to the first embodiment of the present disclosure when the cover member 110 opens the input unit.

Referring to FIG. 8, when a user does not need to operate the input unit 200, for example, when the user does not start the vehicle, the cover member 110 may cover the input unit 200 to prevent foreign materials from being accumulated on the input unit 200.

Referring to FIG. 9, when the user needs to operate the input unit 200, for example, when the user starts the vehicle, the cover member 110 may move to open the input unit 200 in order to allow the user to operate the input unit 200.

Meanwhile, in FIG. 9, an ignition unit 60 for starting the vehicle is shown. The ignition unit 60 shown in FIG. 9 is a smart ignition key, however, a separate key may be used which can be inserted into a key hole and turned.

Figure 10:
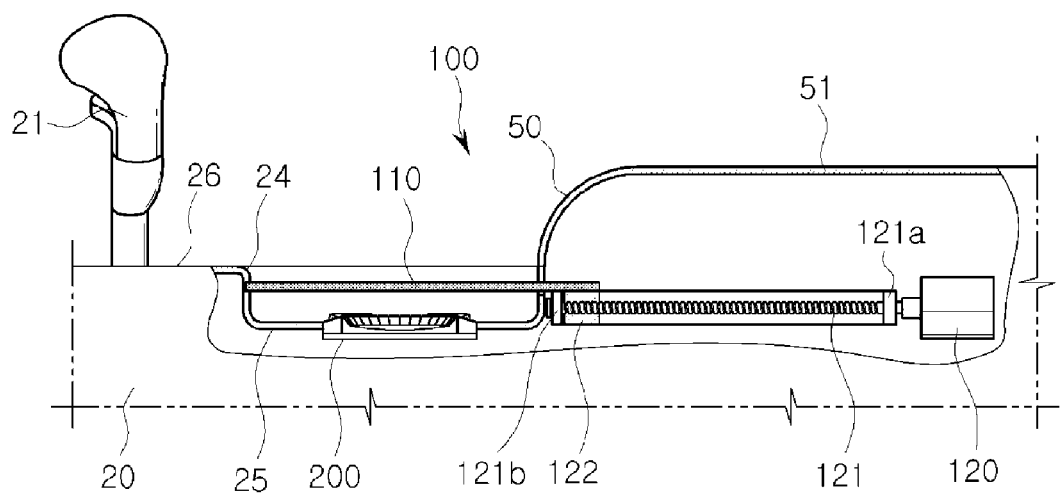
FIGS. 10 and 11 are cross-sectional views showing a driving unit according to a first embodiment of the present disclosure.
Figure 11:
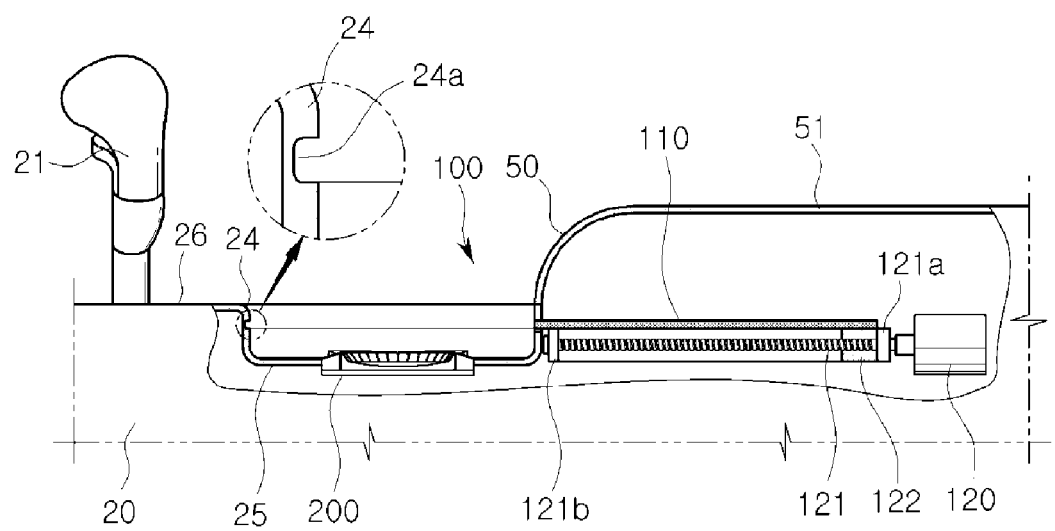

FIGS. 10 and 11 are cross-sectional views showing a driving unit according to a first embodiment of the present disclosure.

The driving unit according to the first embodiment of the present disclosure may include a driver 120 to provide a driving force, a screw 121 to rotate by operation of the driver 120, and a nut member 122 coupled with the screw 121 and configured to move translationally.

The driver 120 may be a motor operated by electricity that generates torque. Meanwhile, the motor which is the driver 120 may change the rotation direction of its rotating shaft according to applied current.

The screw 121 may connect to the rotating shaft of the driver 120, and rotate according to operation of the driver 120.

The nut member 122 may be coupled with the screw 121, and change rotational motion of the driver 120 to translational motion. Although not shown in the drawings, the nut member 122 may move forward or backward according to rotation of the screw 121, without rotating together with the screw 121.

More specifically, the nut member 122 may have a through hole through which the screw 121 passes. A ball for reducing friction may be interposed between the thread formed on the outside diameter of the screw 121 and the thread formed in the inside diameter of the nut member 122 so as to minimize torque loss of the screw 121, and transfer the torque to the nut member 122.

The nut member 122 may connect to the cover member 110. Accordingly, the cover member 110 may move forward or backward together with movement of the nut member 122.

Meanwhile, the nut member 122 may be configured to move within a limited moving range. For example, the nut member 122 may move within a moving range in which one end of the nut member 122 can be supported by a first catching member 121a provided in the back end of the screw 121 and the other end of the nut member 122 can be supported by a second catching member 121b provided in the front end of the screw 121.

If the screw 121 rotates in one direction in the state of the driving unit as shown in FIG. 10, the nut member 122 may move backward so that the cover member 110 opens the input unit 200, as shown in FIG. 11. On the contrary, if the screw 121 rotates in the other direction in the state of the driving unit as shown in FIG. 11, the nut member 122 may move forward so that the cover member 110 covers the input unit 200, as shown in FIG. 10.

Meanwhile, in front of the input unit 200, the shielding member 24 may be provided, as described above. In FIGS. 10 and 11, a case in which a mounting surface 25 on which the input unit 200 is mounted is lower than a mounting surface 26 on which the gear 21 is installed so that a step is made between the two mounting surfaces 25 and 26, and the shielding member 24 is disposed at the step is shown. However, the input unit 200 and the gear 21 may be mounted on the same surface, and the shielding member 24 may protrude in front of the input unit 200.

In the shielding member 24, a shielding groove 24a into which the fore end of the cover member 110 is inserted may be formed. The fore end of the cover member 110 may be inserted into the shielding groove 24a so as to prevent foreign materials such as dust from getting into space where the input unit 200 is installed.

Figure 12:
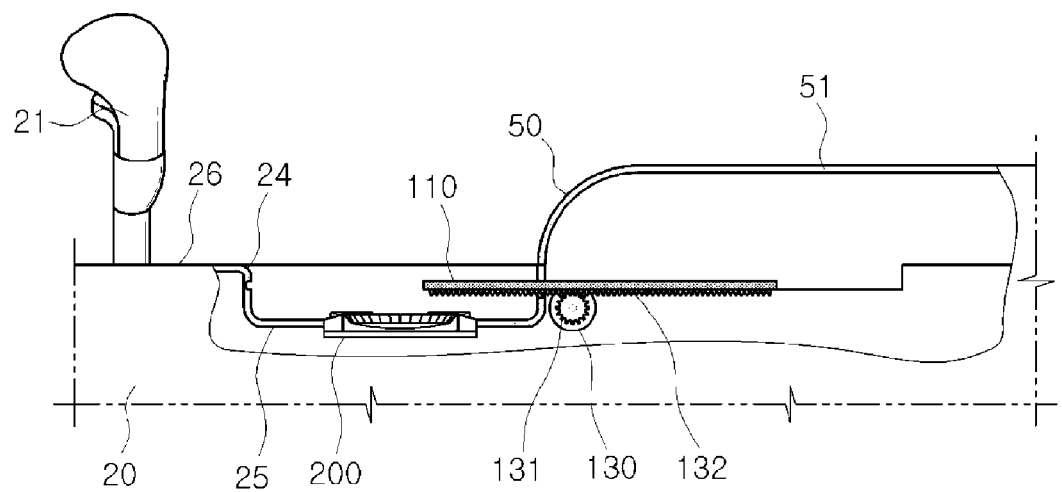
FIG. 12 is a cross-sectional view showing a driving unit according to a second embodiment of the present disclosure.

FIG. 12 is a cross-sectional view of a driving unit according to a second embodiment of the present disclosure.

The driving unit according to the second embodiment of the present disclosure may include a driver 130 to provide a driving force, a pinion gear 131 to rotate by operation of the driver 130, and a rack gear 132 gear-coupled with the pinion gear 131 and configured to move translationally.

The driver 130 may be a motor operated by electricity to generate torque. Meanwhile, the motor which is the driver 130 may change the rotation direction of its rotating shaft according to applied current.

The pinion gear 131 may connect to the rotating shaft of the driver 130, and rotate according to operation of the driver 130.

The rack gear 132 may be engaged with the pinion gear 131, and change rotational motion of the driver 130 to translational motion. Although not shown in the drawings, the rack gear 132 may be supported by a guide member (not shown) to guide translational motion to move forward or backward according to rotation of the pinion gear 131.

For example, the rack gear 132 may be attached on the lower surface of the cover member 110. Accordingly, the cover member 110 may move forward or backward according to movement of the rack gear 132.

A method in which the driving unit according to the second embodiment of the present disclosure operates is as follows. If the pinion gear 131 rotates in one direction by operation of the driver 130, the rack gear 132 may move backward so as for the cover member 110 to open the input unit 200. On the contrary, if the pinion gear 131 rotates in the opposite direction by operation of the driver 130, the rack gear 132 may move forward so as for the cover member 110 to cover the input unit 200.

Figure 13:
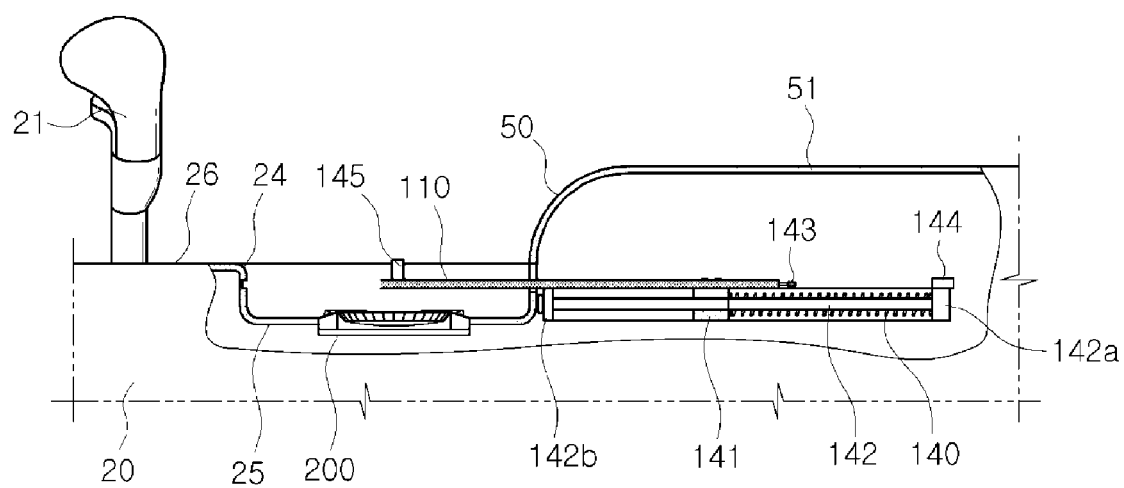
FIG. 13 is a cross-sectional view showing a driving unit according to a third embodiment of the present disclosure.

FIG. 13 is a cross-sectional view of a driving unit according to a third embodiment of the present disclosure.

Referring to FIG. 13, the driving unit according to the third embodiment of the present disclosure may include an elastic member 140 to provide an elastic force, and a moving member 141 to move forward or backward by the elastic force of the elastic member 140.

The elastic member 140 may be a coil spring, and may have any shape as long as it can apply an elastic force to the moving member 141.

The moving member 141 may be guided and moved along a guide shaft 142. For example, the moving member 141 may have a through hole through which the guide shaft 142 having a bar shape passes so as to move forward or backward along the guide shaft 142.

For example, the moving member 141 may be attached to the lower surface of the cover member 110. Accordingly, the cover member 110 may move forward or backward according to movement of the moving member 141.

Meanwhile, the moving member 141 may be configured to move within a limited moving range. Also, the moving member 141 may enable the cover member 110 to be maintained in the state of opening the input unit 200.

For example, one end of the elastic member 140 may be supported by a first catching member 142a provided at the back end of the guide shaft 142, and the other end of the elastic member 140 may be supported by the back end of the moving member 141. Also, forward movement of the moving member 141 may be limited by a second catching member 142b provided at the fore end of the guide shaft 142.

Also, a fixing pin 143 may be connected to one end of the moving member 141 or the cover member 110, and a fixing pin catching member 144 may be connected to one end of the first catching member 142a. When the fixing pin 143 is caught by the fixing pin catching member 144 and fixed, the moving member 141 may be fixed against the elastic force of the elastic member 140. However, a configuration for fixing the opened cover member 110 may be implemented using any one of various techniques that are used in the related art.

A method in which the driving unit according to the third embodiment of the present disclosure operates is as follows. When no external force is applied, the moving member 141 may cover the input unit 200 by an elastic force provided by the elastic member 140. In this state, if a user applies an external force by pulling a handle 145 provided on the cover member 110, the moving member 141 may move backward along the guide shaft 142 so as for the cover member 110 to open the input unit 200. If the cover member 110 moves until the fixing pin 143 protruding on the back end of the cover member 110 and is caught by the fixing pin catching member 144, the cover member 110 may be fixed in the state of opening the input unit 200.

Meanwhile, if the user releases the fixing pin 143 from the fixing pin catching member 144, the moving member 141 may move forward by an elastic force provided by the elastic member 140 so as for the cover member 110 to cover the input unit 200.

Figure 14:
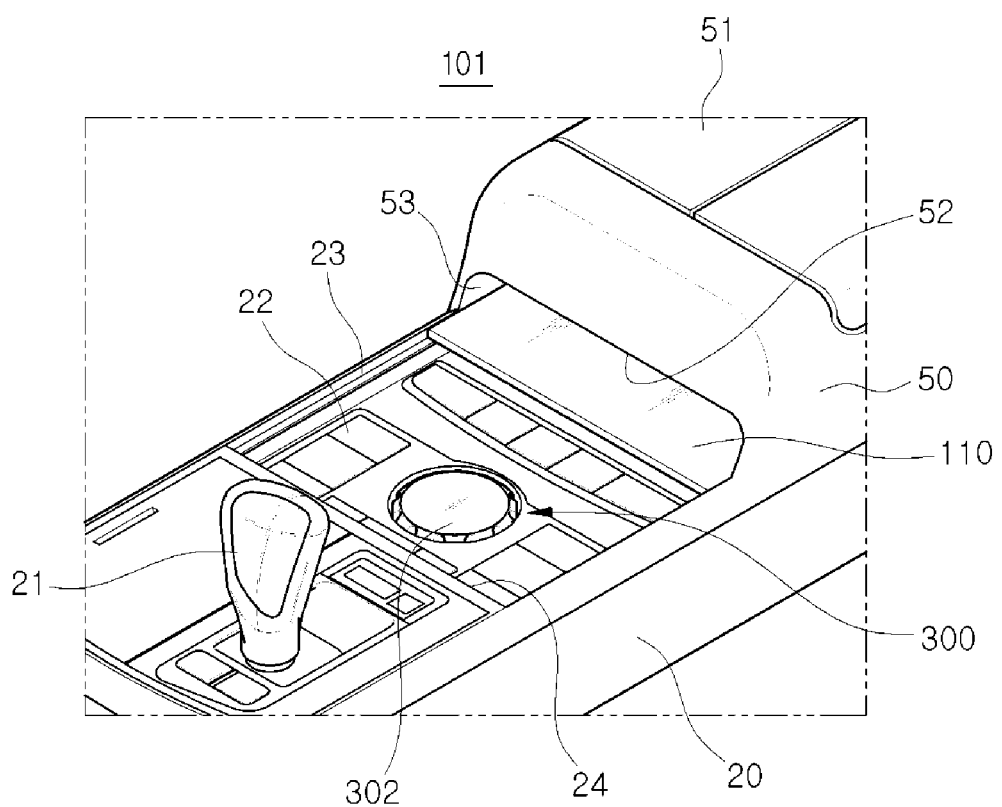
FIGS. 14 and 15 are perspective views of an input apparatus for a vehicle according to another embodiment of the present disclosure.
Figure 15:
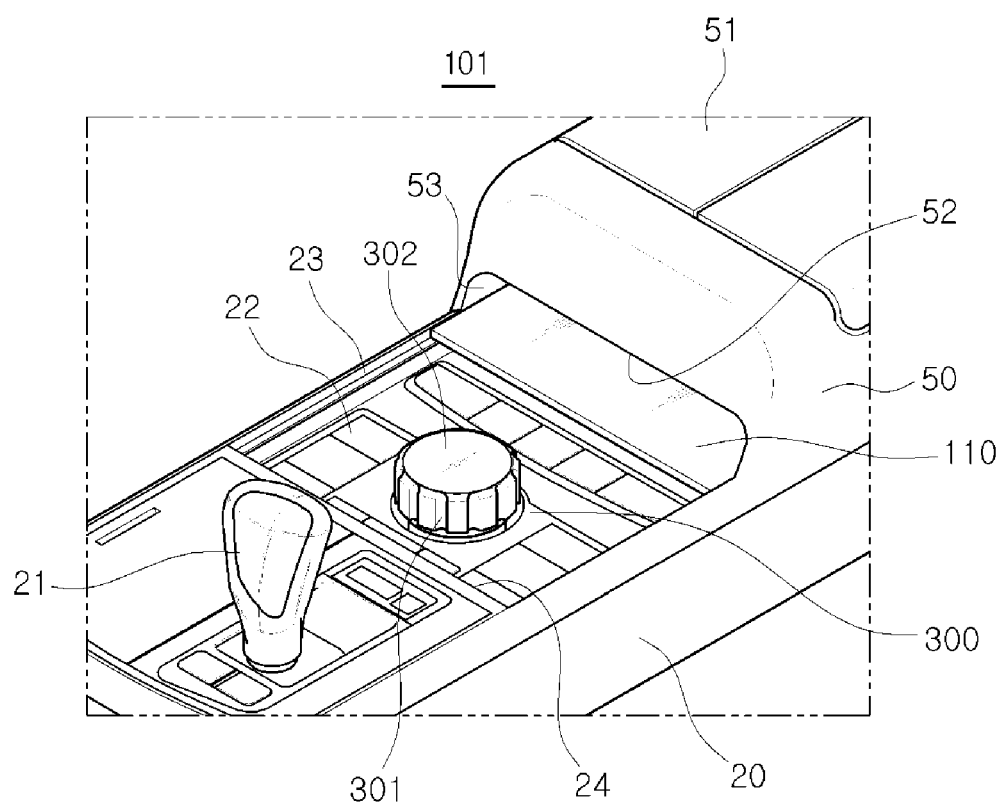

FIGS. 14 and 15 are perspective views of an input apparatus for a vehicle according to another embodiment of the present disclosure.

Referring to FIG. 14, an input apparatus 101 for a vehicle according to another embodiment of the present disclosure may include a dial input unit 300 (hereinafter, also simply referred to as an input unit) according to a second embodiment of the present disclosure. The input unit 300 may include a body 303 (referring to FIG. 16), and a dial unit 301 mounted in the shape of a cylinder on the body 303. A user may grip and turn the outside surface of the dial unit 301 to input a rotation signal.

The body 303 of the input unit 300 may be rotatable in predetermined directions (a clockwise direction and a counterclockwise direction) along a predetermined rotating axis. Also, the input unit 300 may be tilted in at least one direction with respect to the central axis of the body 303. For example, the input unit 300 may be tilted in front, back, left, and right directions. However, the input unit 300 may be tilted in other various directions. The user may rotate the dial unit 301 or make the input unit 300 tilt in a specific direction to input a predetermined instruction or command.

Also, the input unit 300 may include a touch unit 302 capable of recognizing touch inputs. The user may make a predetermined touch gesture on the touch unit 302 of the input unit 300 to input a desired command or instruction. The touch unit 302 may be any one of various kinds of touch panels well-known in the art, such as a resistive type touch panel or a capacitive type touch panel.

The input unit 300 may install various operation-related components therein. In the input unit 300, a rotating shaft member with which the input unit 300 is rotatably coupled, and the related components (for example, a bearing) may be installed. The rotating shaft member may have a structure capable of tilting the input unit 300 in four directions as described above. The rotating shaft member may be tilted by a driving force supplied from a motor (not shown).

Also, in the input unit 300, various semiconductor chips and a PCB may be installed. The semiconductor chips may be packaged on the PCB. The semiconductor chips may perform data processing or store data. The semiconductor chips may interpret a predetermined electrical signal generated according to movement of the input unit 300 or manipulation applied on any one of buttons mounted on the input unit 300, create a predetermined control signal according to the result of the interpretation, and then transfer the predetermined control signal to a controller or a display unit.

Meanwhile, the input unit 300 may pop up as necessary. Referring to FIG. 14, when the user does not use the input unit 300, the input unit 300 may be embedded in the center plate 20. Also, referring to FIG. 15, when the user uses the input unit 300, the input unit 300 may pop up for the dial unit 301 to protrude from the center plate 20.

Also, when the user does not use the dial unit 301, the input unit 300 may be embedded in the center plate 20 without popping up, while allowing a user to make a gesture on the touch unit 302.

Figure 16:
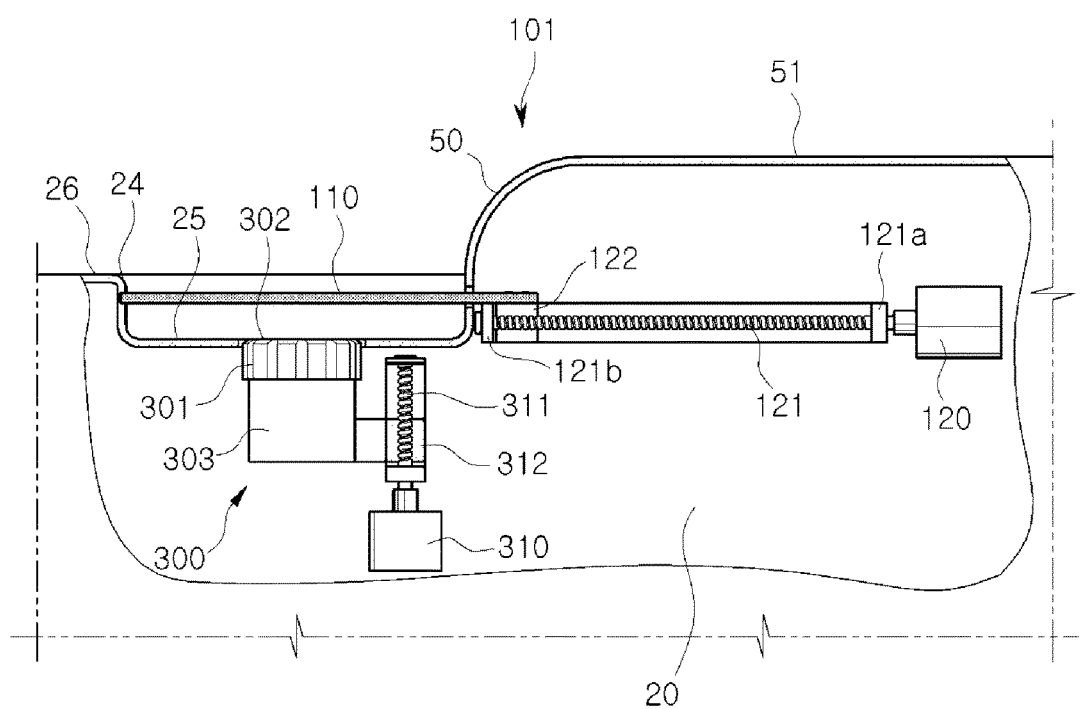
FIGS. 16 to 18 are cross-sectional views of an input unit according to a second embodiment of the present disclosure when the input unit is coupled with a driving unit according to a fourth embodiment of the present disclosure.
Figure 17:
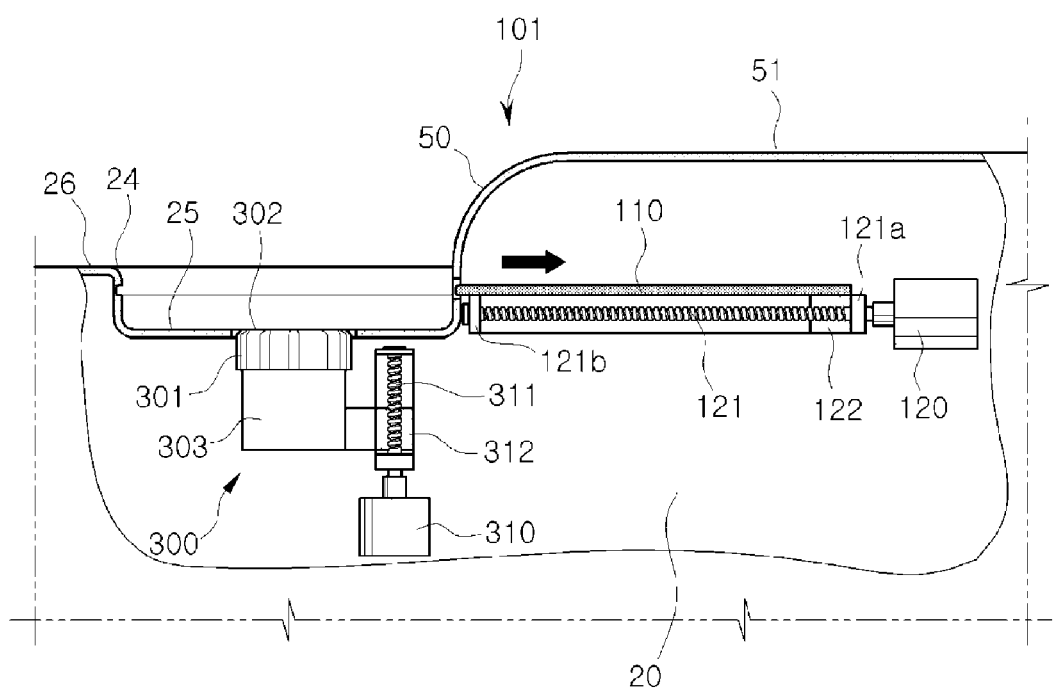
Figure 18:
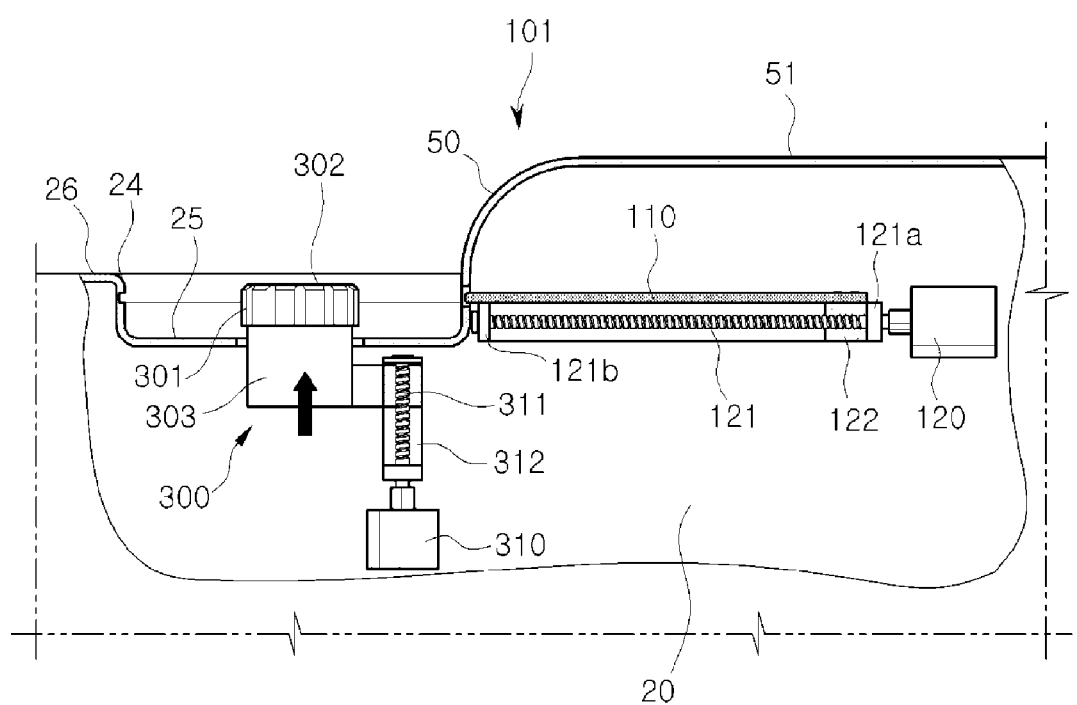

FIGS. 16 to 18 are cross-sectional views of the input unit 300 according to the second embodiment of the present disclosure when the input unit 300 is coupled with a driving unit according to a fourth embodiment of the present disclosure.

The driving unit according to the fourth embodiment of the present disclosure may include a driver 310 to provide a driving force, a screw 311 to rotate according to an operation of the driver 310, and a nut member 312 coupled with the screw 311 and configured to move translationally.

The driver 310 may be a motor operated by electricity to generate torque. Meanwhile, the motor which is the driver 310 may change the rotation direction of its rotating shaft according to applied current.

The screw 311 may connect to the rotating shaft of the driver 310, and rotate according to an operation of the driver 310.

The nut member 312 may be coupled with the screw 311, and change rotational motion of the driver 310 to translational motion. Although not shown in the drawings, the nut member 312 may and move up and down according to rotation of the screw 311, without rotating together with the screw 311.

More specifically, the nut member 312 may have a through hole through which the screw 311 passes. A ball for reducing friction may be interposed between the thread formed on the outside diameter of the screw 311 and the thread formed in the inside diameter of the nut member 312 so as to minimize torque loss of the screw 311, and transfer the torque to the nut member 312.

The nut member 312 may connect to the body 303 of the input unit 300. Accordingly, the body 303 may move up and down together with movement of the nut member 312.

If the screw 311 rotates in one direction by operation of the driver 310 in the state of the driving unit as shown in FIG. 17, the nut member 312 may move up so as for the body 303 to protrude from a mounting surface 25, as shown in FIG. 18. Accordingly, a user can rotate the dial unit 301 exposed to the outside.

In contrast, if the screw 311 rotates in the opposite direction in the state of the driving unit as shown in FIG. 18, the nut member 312 may move down so as for the body 303 to be accommodated below the mounting surface 25, as shown in FIG. 17.

Meanwhile, the height of the input unit 300 according to the second embodiment of the present disclosure when the main body 303 moved up may be higher than the height of the cover member 110, and the height of the input unit 300 when the main body 303 moved down may be lower than the height of the cover member 110. That is, if the main body 303 moves up when the cover member 110 covers the input unit 300, the main body 303 may collide with the cover member 110. Accordingly, when the main body 303 moves up, the cover member 110 may have to move backward to open the input unit 300.

Now, a method in which the cover member 110 operates as shown in FIGS. 16 to 18 will be described below.

Referring to FIG. 16, when a user does not use the input unit 300, the body 303 may be maintained below the mounting surface 25, and the cover member 110 may cover the input unit 300 to prevent foreign materials such as dust from being accumulated on the input unit 300 or getting into gaps of the input unit 300.

Referring to FIG. 17, when the user uses the input unit 300, the cover member 110 may move backward to open the upper part of the input unit 300. The driving of the cover member 110 has been described above with reference to FIGS. 10 and 11, and accordingly, a detailed description thereof will be omitted.

Referring to FIG. 18, after or when the cover member 110 moves back, the input unit 300 may rise. If the input unit 300 rises completely, the touch unit 302 mounted on the upper surface of the input unit 300 may protrude higher than the cover member 110.

Figure 19:
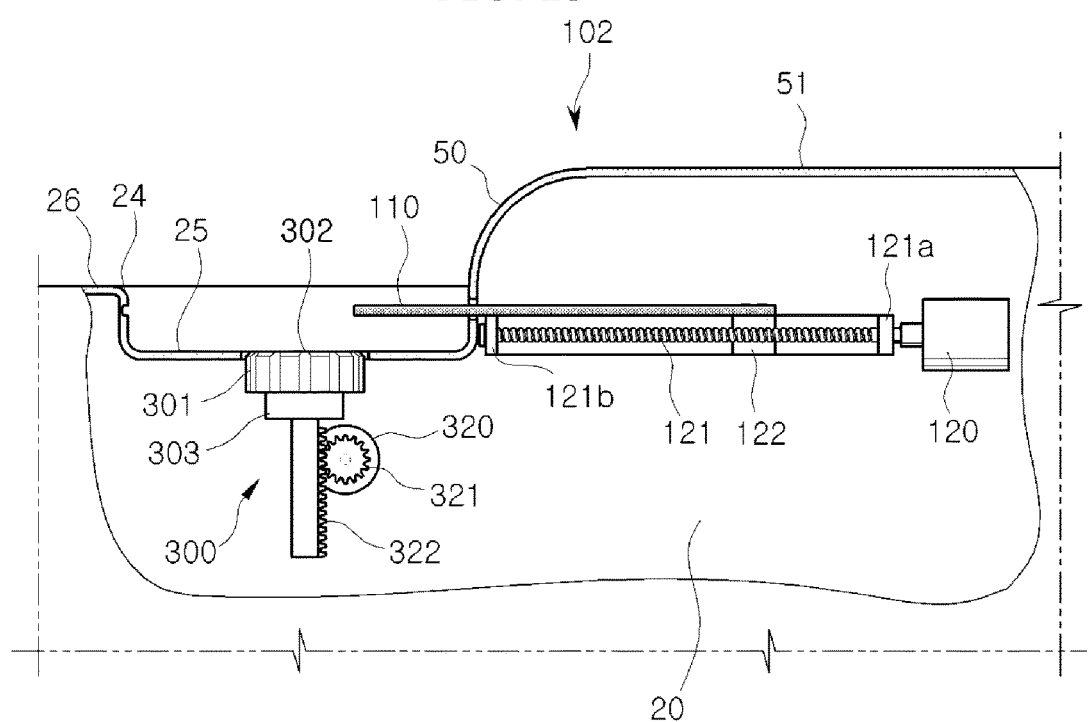
FIG. 19 is a cross-sectional view of the input unit according to the second embodiment of the present disclosure when the input unit is coupled with a driving unit according to a fifth embodiment of the present disclosure.

FIG. 19 is a cross-sectional view of the input unit 300 according to the second embodiment of the present disclosure when the input unit 300 is coupled with a driving unit according to a fifth embodiment of the present disclosure.

The driving unit according to the fifth embodiment of the present disclosure may include a driver 320 to provide a driving force, a pinion gear 321 to rotate by operation of the driver 320, and a rack gear 322 gear-coupled with the pinion gear 321 and configured to move translationally.

The driver 320 may be a motor operated by electricity to generate torque. Meanwhile, the motor which is the driver 320 may change the rotation direction of its rotating shaft according to applied current.

The pinion gear 321 may connect to the rotating shaft of the driver 320, and rotate according to an operation of the driver 320.

The rack gear 322 may be engaged with the pinion gear 321, and change rotational motion of the driver 320 to translational motion. Although not shown in FIG. 19, the rack gear 322 may be supported by a guide member (not shown) to guide translational motion to move up and down by rotation of the pinion gear 321.

For example, the rack gear 322 may be attached on one surface of the body 303. Accordingly, the input unit 300 may move up and down according to movement of the rack gear 322.

A method in which the driving unit according to the fifth embodiment of the present disclosure operates is as follows. If the pinion gear 321 rotates in one direction by operation of the driver 320, the rack gear 322 may move up so as for the body 303 to protrude from the mounting surface 25. Accordingly, the user can rotate the dial unit 301 exposed to the outside.

In contrast, if the pinion gear 321 rotates in the opposite direction by an operation of the driver 320, the rack gear 322 may move down so as for the body 303 to be accommodated below the mounting surface 25.

Hereinafter, a method of controlling opening/closing of the cover member 110 will be described.

The controller may control, when a user starts the vehicle, the cover member 110 to be opened, and control, when the user turns the ignition off, the cover member 110 to be closed.

Also, the controller may control, when a controlled target that is controlled by the input unit 200 is powered on, the cover member 110 to be opened, and control, when the controlled target is powered off, the cover member 110 to be closed.

Also, the controller may control, when a controlled target that is controlled by an Audio/Video/Navigation (AVN) system is powered on, the cover member 110 to be opened, and control, when the controlled target is powered off, the cover member 110 to be closed.

According to an embodiment, a proximity sensor (not shown) for determining whether a user's arm is rested on the arm rest 51 may be installed around the arm rest 51. In this case, the controller may control opening and closing of the cover member 110 based on the result of sensing by the proximity sensor. More specifically, if it is determined that a users arm is rested on the arm rest 51, the controller may determine that the user is using the input unit 200, and control the cover member 110 to be opened, and if it is determined that no users arm is rested on the arm rest 51, the controller may determine that the user is no longer using the input unit 200, and control the cover member 110 to be closed.

Since the input apparatus for vehicle according to the embodiment of the present disclosure covers the input unit when a user does not use the input unit, and exposes the input unit to the outside when the user uses the input unit, it is possible to prevent foreign materials such as dust from being accumulated on the input unit, thereby maintaining a clean input unit, preventing adverse operations of the input unit, and also improving the durability of the input unit.

Also, by minimizing a time for which the input unit is exposed to direct sunlight, it is possible to prevent discoloration of the input unit and to avoid adverse operations of the input unit due to radiant heat.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An input apparatus for a vehicle comprising a cover member for covering an upper part of an input unit installed in a center plate provided between a driver seat and a passenger seat,
    wherein the cover member moves forward from a center console located in a back part of the center plate to cover the upper part of the input unit.

2. The input apparatus according to claim 1, wherein the cover member is accommodated below an arm rest formed in an upper part of the center console.

3. The input apparatus according to claim 1, wherein the cover member moves through an opening formed in front of the center console to be accommodated in the center console.

4. The input apparatus according to claim 1, wherein the cover member is guided by rails disposed in the center plate to move forward or backward.

5. The input apparatus according to claim 4, wherein when the cover member moves forward, a fore end of the cover member contacts the center plate to shield the upper part of the input unit.

6. The input apparatus according to claim 1, further comprising:
    a screw configured to rotate by power provided by a driver; and
    a nut member connected to the cover member, screw-coupled with the screw, for moving translationally in a forward/backward direction according to rotation of the screw.

* * * * *